(12) United States Patent
Cameron (10) Patent No.: US 6,484,767 B2
(45) Date of Patent: Nov. 26, 2002

(54) POWER TOOL GUIDE AND WORK CENTER

(76) Inventor: Alan B. H. Cameron, 66 Iola Ave., Farmborough Heights, New South Wales, 2526 (AU)

( * ) Notice: Subject to any disclaimer, the term of this patent is extended or adjusted under 35 U.S.C. 154(b) by 0 days.

(21) Appl. No.: 09/835,031

(22) Filed: Apr. 12, 2001

(65) Prior Publication Data

US 2002/0020467 A1 Feb. 21, 2002

(30) Foreign Application Priority Data

Apr. 17, 2000 (AU) .............................................. PQ7124
Dec. 12, 2000 (AU) .............................................. PR2060

(51) Int. Cl.⁷ .............................. B27C 1/00; B27C 5/10
(52) U.S. Cl. .................... 144/154.5; 83/471.2; 83/574; 144/137; 144/136.95; 144/286.5
(58) Field of Search ................................ 83/574, 471.2, 83/451, 454, 477.1, 471.3; 409/182, 185, 214; 144/134.1, 137, 136.95, 154.5, 286.5

(56) References Cited

U.S. PATENT DOCUMENTS

| | | | | | |
|---|---|---|---|---|---|
| 4,155,383 A | * | 5/1979 | Welliver | .................. | 144/154.5 |
| 4,215,731 A | * | 8/1980 | Maynard | .................. | 144/154.5 |
| 4,630,656 A | * | 12/1986 | Collins | ...................... | 144/154.5 |
| 4,735,531 A | * | 4/1988 | Boerckel et al. | ......... | 144/154.5 |
| 5,682,934 A | * | 11/1997 | Rybski | ..................... | 144/154.5 |

* cited by examiner

*Primary Examiner*—W. Donald Bray
(74) *Attorney, Agent, or Firm*—Sheridan Ross P.C.

(57) ABSTRACT

A work station is provided having a work surface. The work surface comprises spaced apart bearers (42) which are spaced apart and parallel. The bearers (42) are interconnected by braces (43) and intermediate bearer fits between the parallel bearers (42). In some embodiments of the invention, the intermediate bearer carrier a mitre guide (143).

14 Claims, 11 Drawing Sheets

POWER TOOL GUIDE AND WORK CENTER

The invention relates to work stations and more particularly to a work station which functions as a guide for power tools.

A wide variety of power tools are suitable for residential or professional use. Many of these power tools such as routers, circular saws, jigsaws and sanders may either be operated by holding them in the hand or by mounting them to a work center of some description. Prior art work stations for holding a power tool are known.

The present invention seeks to provide a meaningful alternative to known work stations, which alternative is reliable, economical and versatile.

Accordingly, there is provided a work station having a base, the base comprising parallel tracks which are interconnected by a pair of rotating shafts. The shafts bear stub axles which are offset from the longitudinal axis of the shaft. The axles support a work surface. A carriage is adapted to slide within each of the tracks. A tool guide extends from one carriage to the other. The tool guide comprises a pair of parallel guide rails, each guide rail comprising an inverted "U" shaped channel having an inwardly directed integral flange for supporting a tool.

In one embodiment of the invention, a "U" shaped clip is suspended by each of the shafts, a portion of each clip extending below is respective shaft facilitating an engagement between the work station of the present invention and another clamping device.

In other embodiments of the invention the stub axles support a working surface, the working surface comprising a pair of rigid braces, a pair of parallel bearers extending between the braces, a gap separating the parallel bearers.

In another embodiment of the invention, a backstop is carried by one of the tracks, the backstop supported in the track by a plate, the plate wedged in the track by a thread fastener which bears on an interior surface of the track.

In another embodiment, a blade guard retainer is attached to the tool guide.

The invention will now be described by way of example only, with reference to the accompanying drawings in which.

Figure 1:
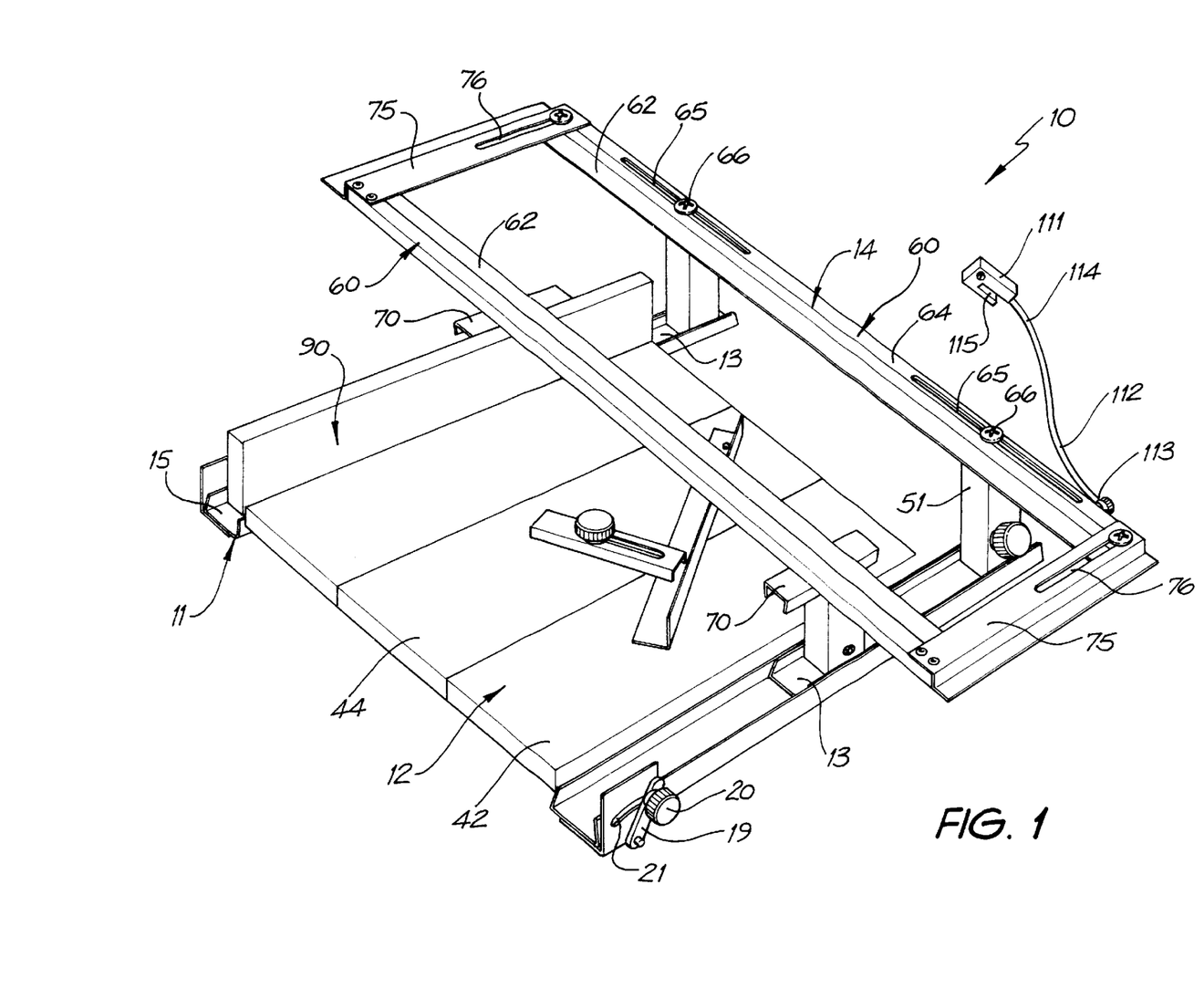
FIG. 1 is a perspective view of a work station for power tools according to the teachings of the present invention.

As shown in FIG. 1, a work center 10 comprises a base 11, an adjustable work surface 12, a pair of sliding carriages 13 and a tool guide 14.

Figure 3:
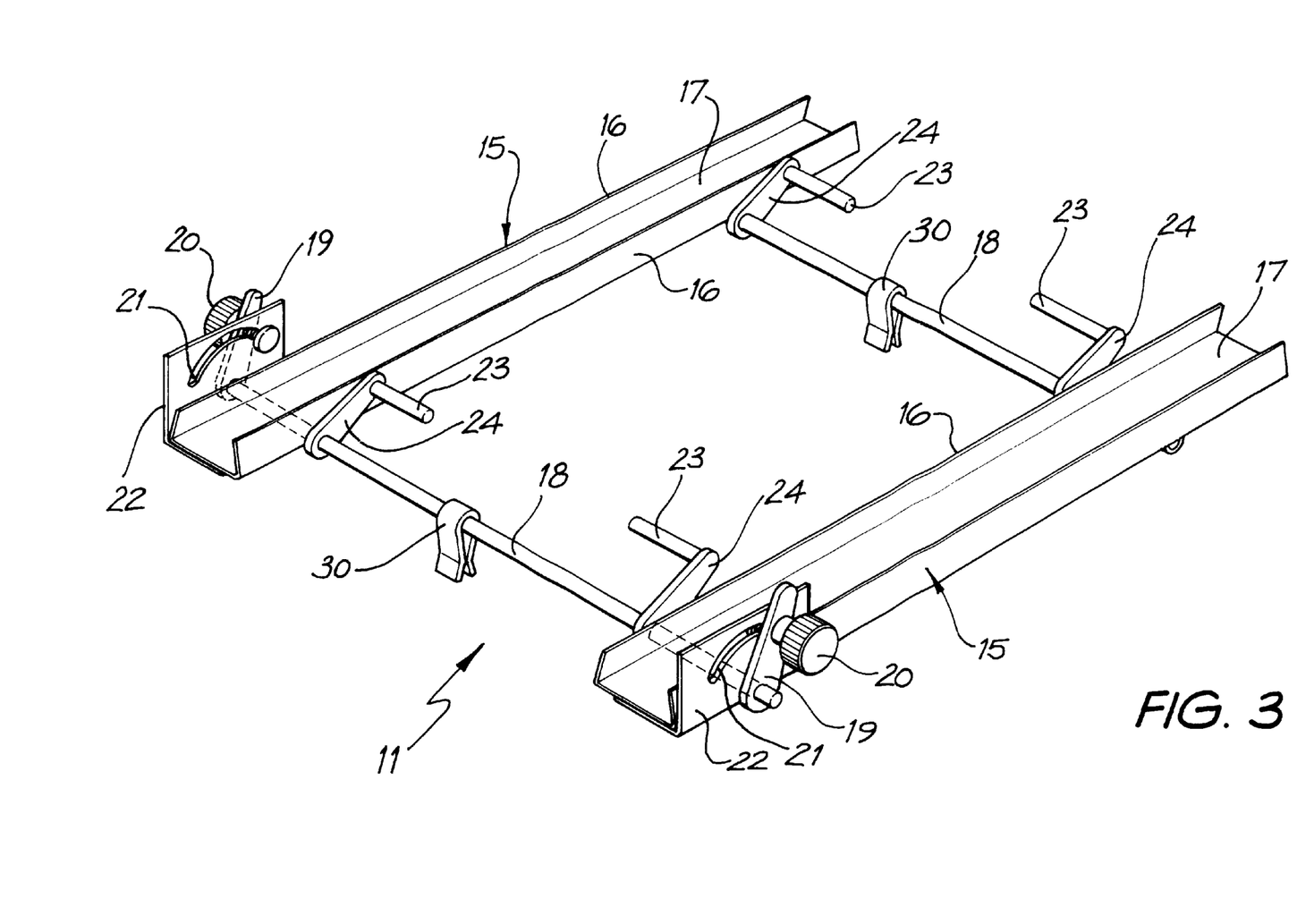
FIG. 3 is a perspective view of a base according to the teachings of the present invention, FIG. 4 are side and perspective views of a clip as illustrated in FIG. 3.

As shown better in FIG. 3, the base 11 comprises a pair of parallel tracks 15 each of which defines a longitudinal margin of the device 10. Each track 15 is generally "U" shaped, the side walls 16 of each track converging towards a point above the floor 17. A pair of rotating shafts 18 extends between the tracks 15. A lever 19 is attached to one or both ends of the shaft 18. The lever 19 carries a knob and locking screw 20 which cooperates with an arcuate slot 21 to allow the shaft to be set into a variety of orientations and maintained in a particular orientation against the weight of the work which it supports. The arcuate slots are carried by "L" shaped plates 22 which are affixed to the ends of each track 15 in an opposed relationship. The slots may also be formed in the side of one or both tracks.

Each rotating shaft 18 rigidly bears a pair of stub shafts 23. Each stub shaft is carried by an offset arm 24.

Figure 4:
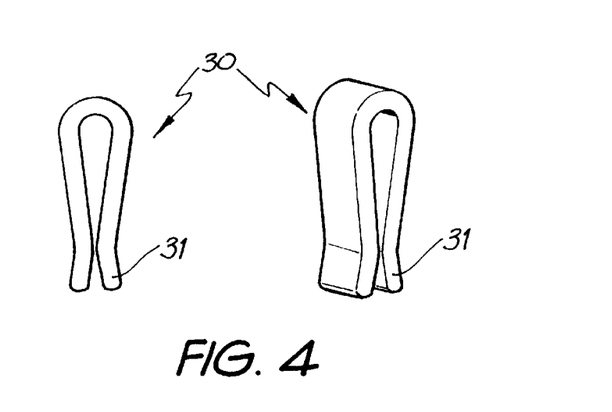

So that the base 11 may be clamped or held by another device, descending clips 30 may be provided around the shafts 18, which "U" shaped clips are depicted in FIG. 4. The clips may be clamped between the jaws of a large vice, for example of the type provided in a Black and Decker WORK MATE™. Diverging ears 31 at the foot of each clamp 30 facilitate insertion of the clamp 30 over the shaft 18.

Figure 7:
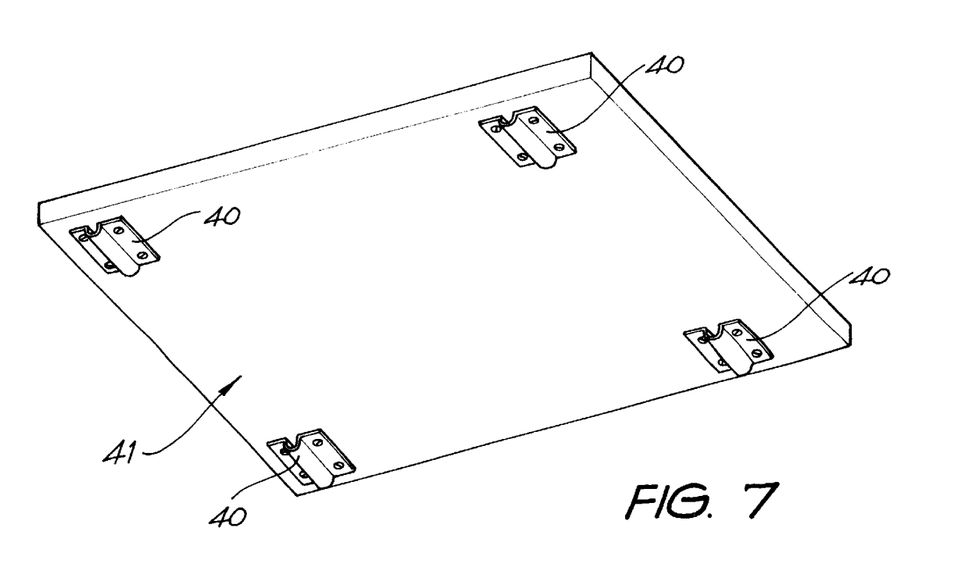
FIG. 7 is a perspective view which illustrates the bottom of a support surface.
Figure 8:
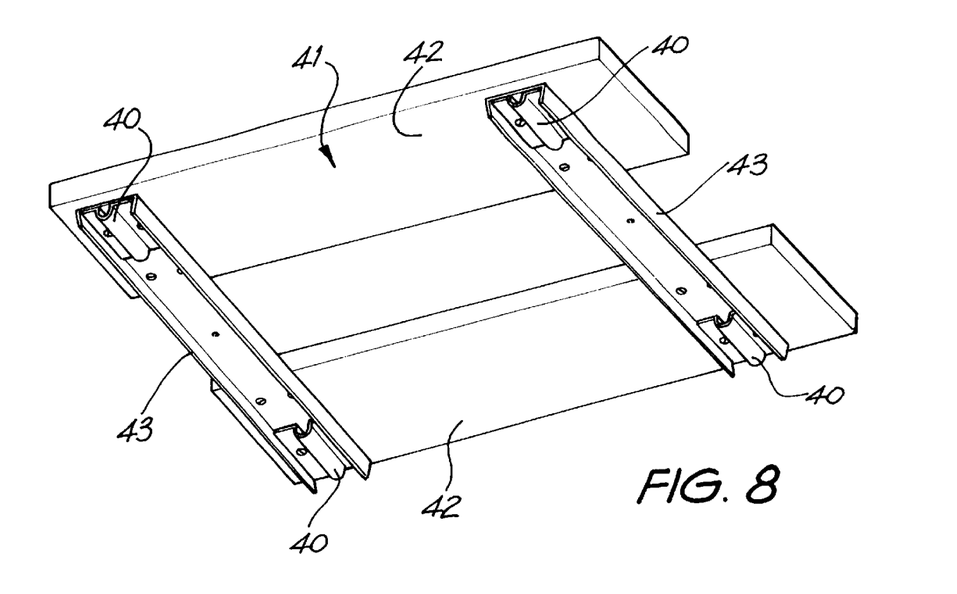
FIG. 8 is a perspective view which illustrates the bottom of a support surface comprising parallel, spaced apart bearers.

The purpose of the stub shafts 23 is to engage the brackets 40 which are carried by the underside of a work surface 41 as depicted in FIGS. 7 and 8. As shown in FIG. 7, a work surface 41 may be a single integral surface with brackets 40 in each corner. In the alternative, a work surface 41 may comprise a pair of spaced apart bearers 42. Spaced apart bearers of the type depicted in FIG. 8 extends between a pair of braces 43 to which they are rigidly attached. The braces 43 include integrally or have rigidly attached to them the brackets 40 which rotatably receive a stub shafts 23 shown in FIG. 3. As shown FIG. 1, an additional intermediate bearer 44 may be interposed between the parallel pair of spaced apart bearers shown in FIG. 8. The intermediate bearer is preferable of the same length and thickness as the bearers 42.

Figure 2:
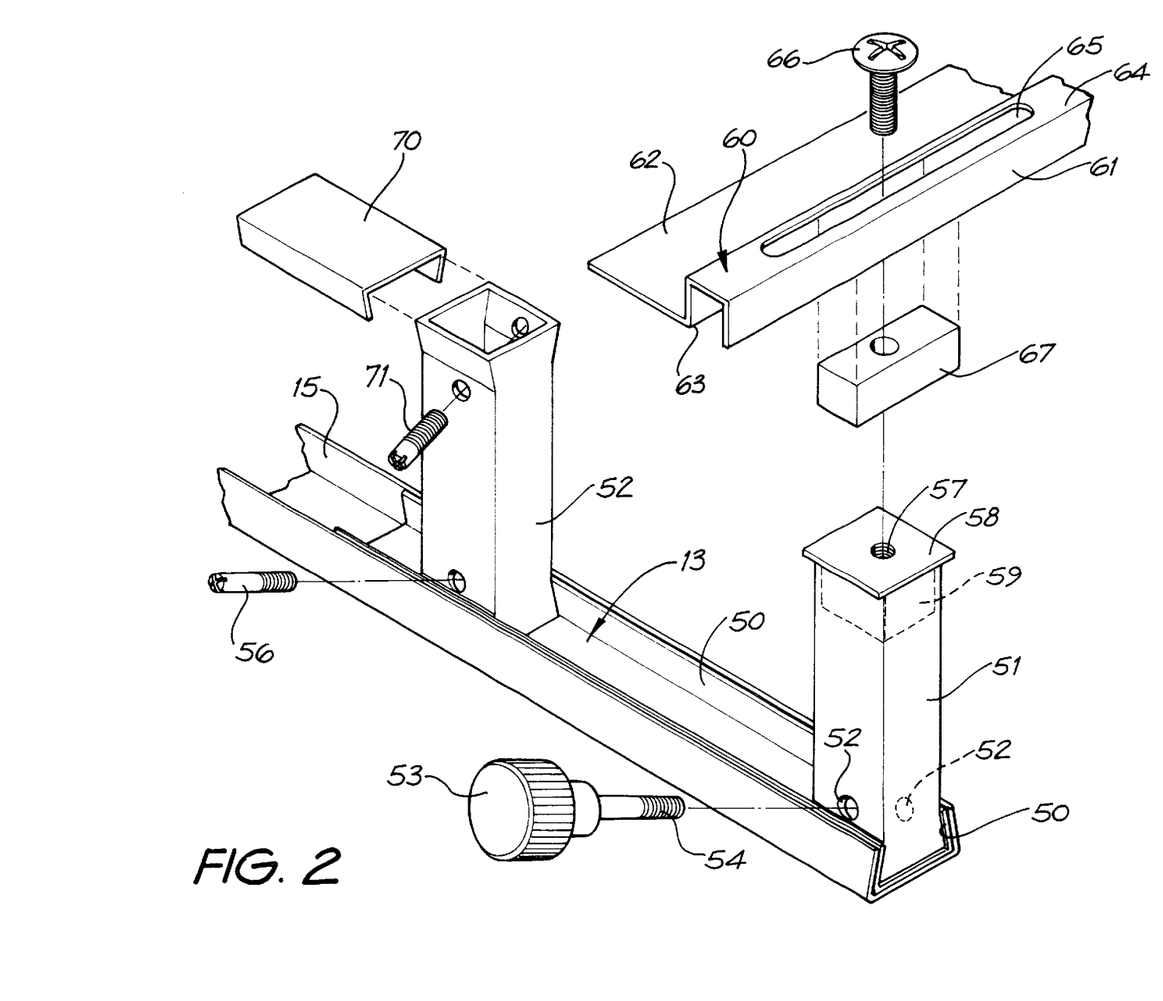
FIG. 2 is an exploded perspective view of a carriage and illustrative how a tool guide is adjustably affixed to a carriage.
Figure 11:
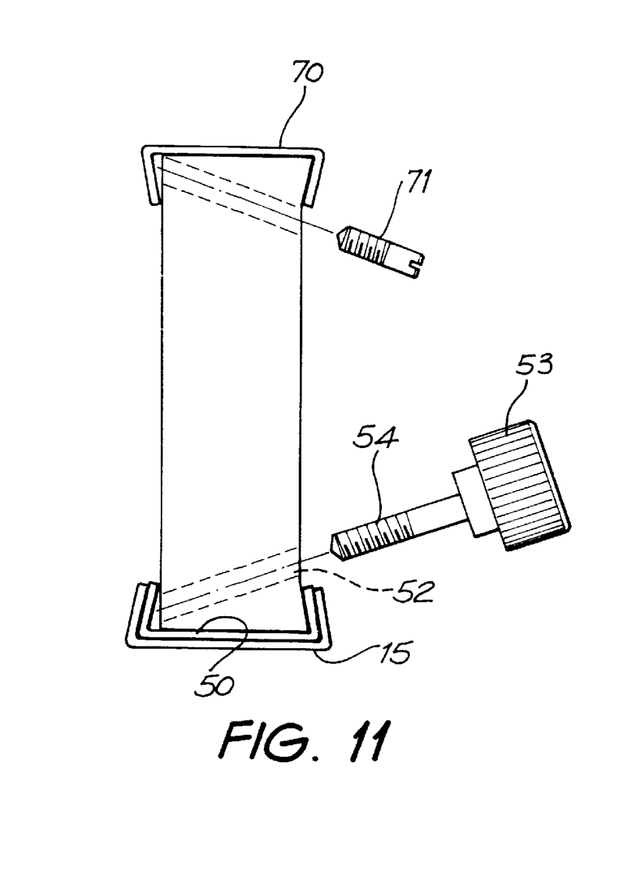
FIG. 11 is an end elevation of a carriage post illustrating top and bottom locking mechanisms.
Figure 12:
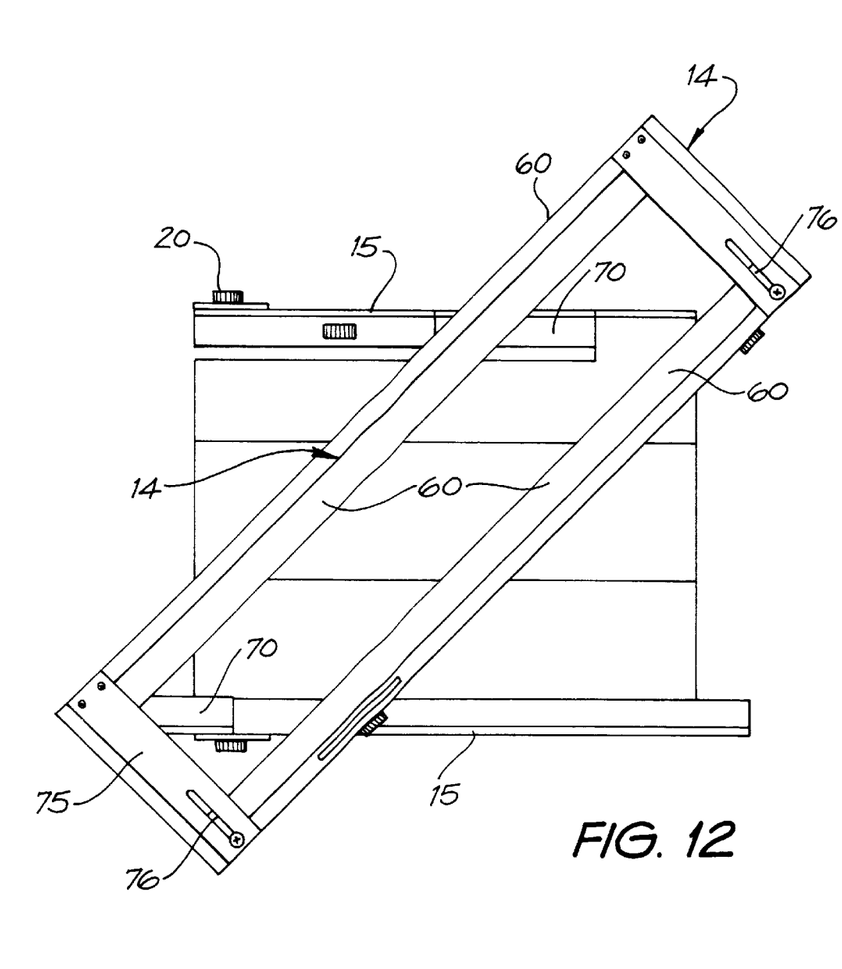
FIG. 12 is a top plan view of a work station.

As shown in FIGS. 1, 2 and 12, a pair of adjustable carriages 13 supports the tool guide 14 above the base 11. As shown in FIG. 2, each carriage 13 generally comprises a "U" shaped channel 50 which fits within and slides within a track 15. Each carriage channel 50 supports a pair of posts 51, 52. As suggested in FIG. 2 and FIG. 11, each post 51 and 52 may be restrained within the carriage 50 by a locking knob 53 with a threaded tip 54. The locking knob 53 enters through openings 52 in the post and exerts a locking force against an interior surface of the cartridge channel 50. In order to accomplish this, at least one opening 52 must be threaded to receive the threaded tip 54. Thus, each post 51, 52 may be restrained within the carriage channel 50 by a locking knob 53 or set screw 56 (see FIG. 2).

As shown in FIG. 2, the side rails 60 of the tool guide 14 adjustably mounted on one of the posts 51 of each carriage. That mounting post 51 has a threaded opening 57 in its top surface 58. The top surface 58 may be formed in a plug 59 which is inserted into an opening defining the upper extremity of the hollow post 51. The side rails 60 comprises an inverted "U" shaped channel 61 which carries an integral flange or tool supporting surface 60 to along its interior edge 63. An upper-most surface 64 of one of the side rails 60 includes a pair of elongated slots 65. The elongated slot 65 admits the passage of a fastener 66 which passes through a bearing block 67. The fastener 68 engages the threaded openings 57 formed in the post 51. The bearing block 67 fits within the inverted "U" shaped channel of the tool guide and prevent the collapse of the channel when the fastener 66 is tightened.

The other post 52 in each carriage 13 serves to support a guide support surface 70 which is adjustably retained by a set screw 71 which passes through and threadably engages the post 52.

As shown in FIGS. 1 and 12, the parallel sides 60 of the tool guide 14 are interconnected by end pieces 75 that are rigidly affixed to one side rail but have a slot 76 at an opposite end for adjustable attachment with respect to the other side rail of the tool guide. The slot 76 allows the distance between the parallel side rails 60 to be adjusted then maintained at a particular separation distance. This allows tools of different widths to be supported on the parallel flange surfaces 62 for sliding movement between the ends 75.

The combination of sliding carriages 13 and pivotable attachment of the tool guide to the carriages 50 allows the entire tool guide to be skewed with respect to the parallel tracks 15 as shown in FIG. 12. This allows the tool carried by the tool guide 14 to transverse the work piece at a variety of angles including both positive and negative angles relative to the generally transverse orientation depicted in FIG. 1.

Figure 5:
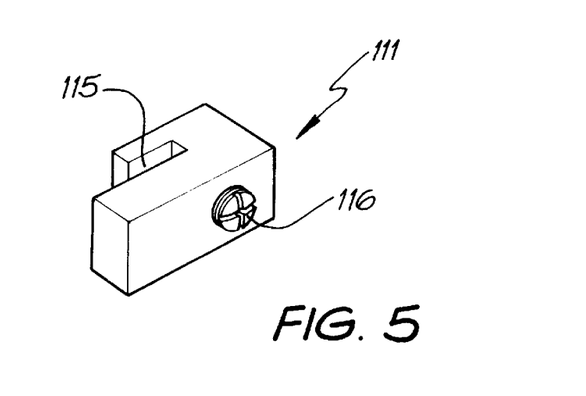
FIG. 5 illustrates the head of a blade guard retainer.
Figure 6:
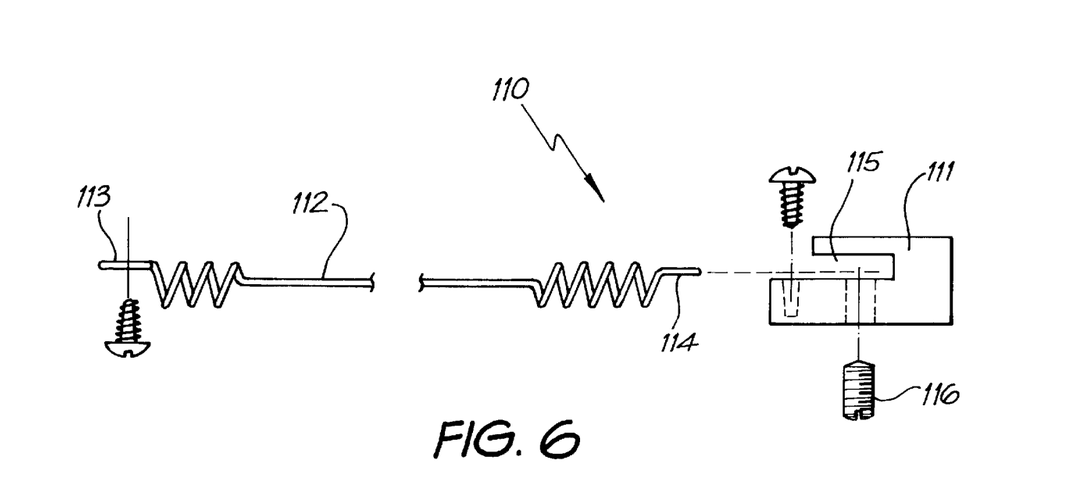
FIG. 6 is an elevation of a blade guard retainer.
Figure 22:
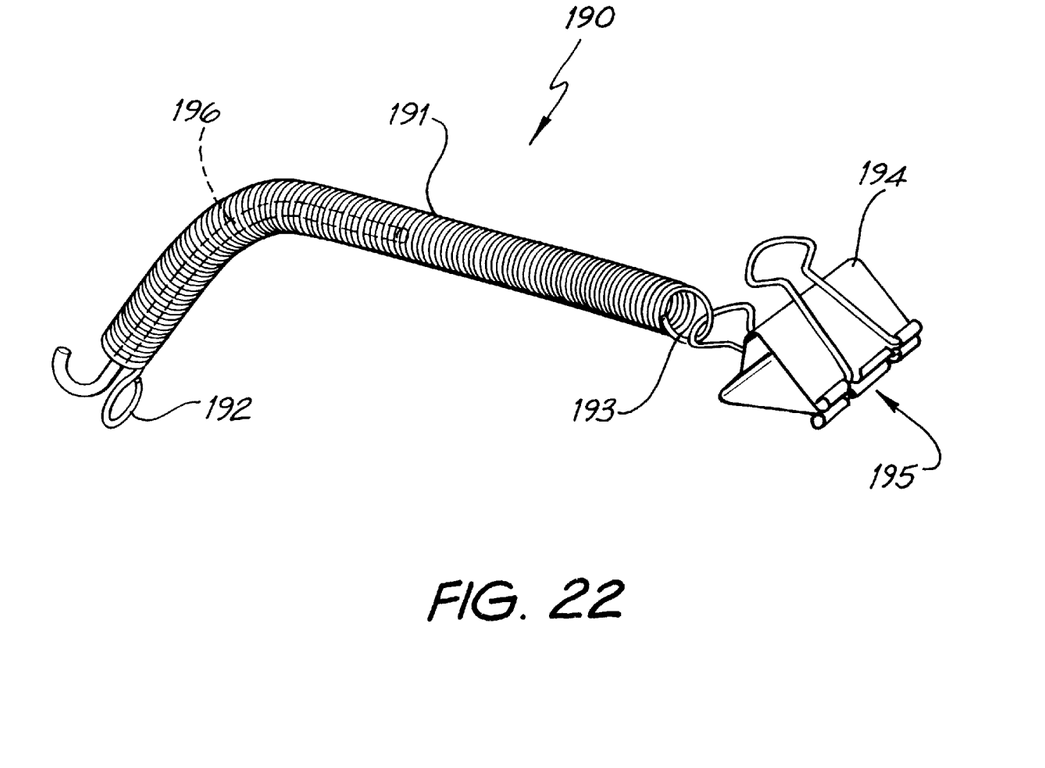
FIG. 22 is a perspective view of an alternate embodiment of a blade guard retainer.

An additional feature of the invention is a blade guard retainer 110 as shown in FIGS. 1, 5 and 22. The retainer 110 comprises a clip 111 and a resilient spring or cord 112. One end of the spring 113 affixes to the tool guide 14. The other end of the spring 114 is affixable to the clip 111. The clip 111 includes a slot 115 which holds (with a set screw 116) the edge of a blade guard as may be found on a circular saw and keeps the blade guard from interfering with the forward progress of the saw. The retainer 110 being attached to the device 10, prevents full removal of the tool from the device unless the clip 111 is first detached.

Figure 9:
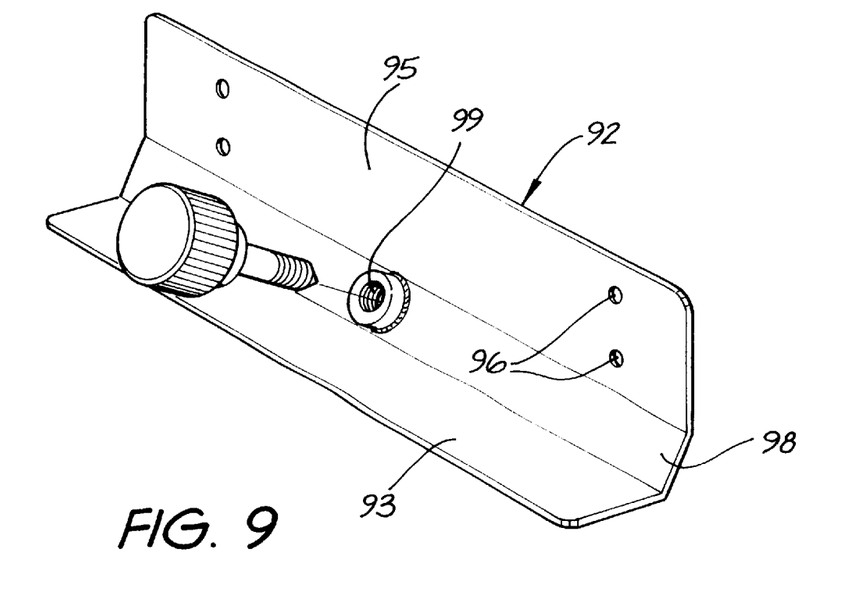
FIG. 9 is a perspective view of a retaining plate for a backstop.
Figure 10:
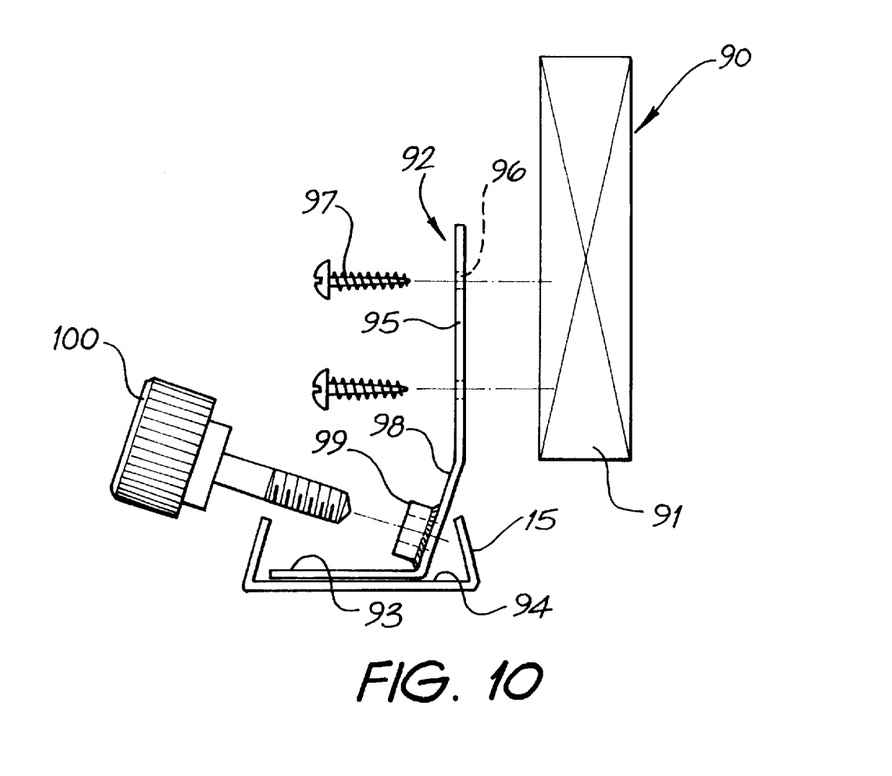
FIG. 10 is an end elevation illustrating the plate depicted in FIG. 9 and the track in which it may be affixed.

A shown in FIGS. 1, 9 and 10, the work center of the present invention may be provided with a backstop 90. The backstop 90 comprises a rectangular board 91 which is carried by a specially adapted plate 92. The plate 92 is generally "J" shaped and (as shown in FIG. 10) its bottom surface 93 rests flatly against the bottom surface 94 of a track 15. An upright surface 95 includes openings 96 through which fasteners 97 may be inserted to affix the board 91. An intermediate angled surface 98 interconnects the upright surface 95 and bottom surface 93 of the plate and carries a fastener or threaded opening 99. An adjustment knob 100 passes through the threaded opening or fastener 99 and locks the plate 92 against then interior surface of the rail 15.

Figure 13:
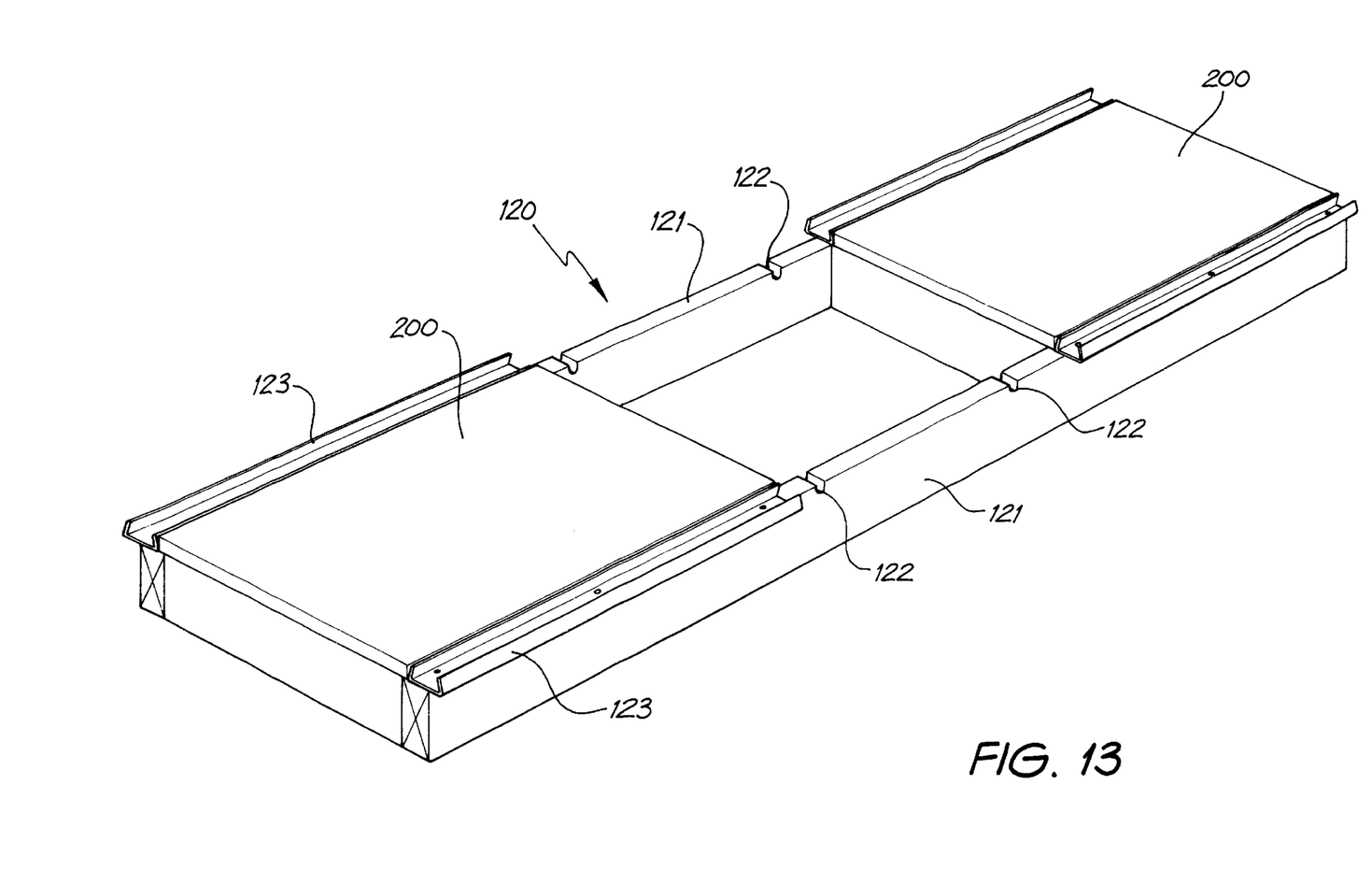
FIG. 13 is a perspective view of work bench incorporating the parallel tracks of the present invention.

As shown in FIG. 13, a work bench 120 of any convenient length may be constructed in accordance with the teachings of the invention. The work bench is preferably constructed from parallel timbers 121 each having two or more pairs of slots or trenches 122 for accepting surface elevating or rotating shafts (18, 23, 24) of the type depicted in FIG. 3. Parallel tracks 123 are provided along all or part of the length of the work bench 120 in alignment with the tracks 15 so that posts, carriages or back stops may be adjustably mounted along any convenient portion. Preferably both additional work surfaces 200 are aligned to be flush with the primary work surface 12, when it is in position. In this way, a tool or saw guide (see 14 in FIG. 1) may be mounted along any portion of the work bench 120. This arrangement allows one or more saws to be used in a variety of positions. In preferred embodiments, the tracks 123 are fixed to the base timbers 121 by fasteners or adhesives.

Figure 14:
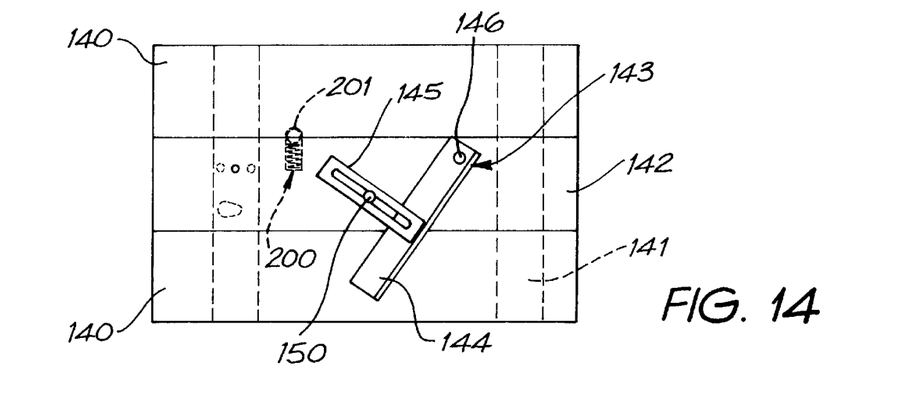
FIG. 14 is a top plan view of a work surface and mitre guide.

As shown in FIG. 14, a work surface 140 may comprise a pair of spaced apart bearers 140 extending between a pair of braces 141 to which they are rigidly attached. This permits an additional bearer 142 to be interposed between the parallel bearers 140. In preferred embodiments of the invention, an adjustable mitre guide 143 is attached to the intermediate bearer 142. The guide 143 comprises a mitre fence 144 and a mitre clamp 145. The mitre fence 143 is attached to the intermediate bearer 142 by a single pivot such as a screw or rivet 146. The pivot allows the fence 144 to assume any number of positions. Once oriented into the correct position, the mitre fence 144 is secured by tightening the locking screw of the mitre clamp. The mitre clamp includes a central slot which pivots and translates about the mitre clamps locking screw 150.

As further shown in FIG. 14, a ball and detent mechanism 200 may be used to secure the intermediate bearer to either or both of the parallel bearers 140. The ball and detent mechanism comprises a hollow cavity which receives a ball which is biased into position by a compression spring. The ball is received into a pocket 201 formed in a cooperating position in the adjacent bearer. It is envisaged that a pair of ball and detent mechanisms are required along each edge of the intermediate bearer. In the alternative, the ball and detent mechanism may be incorporated into the bearers with the cooperating recesses 201 formed in the intermediate bearer.

Figure 15:
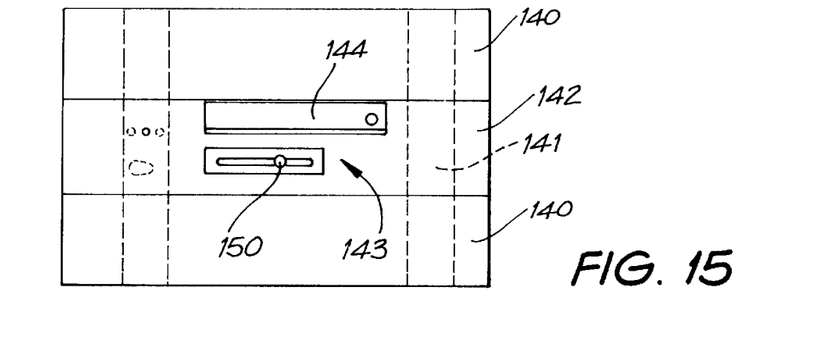
FIG. 15 is a top plan view of a work surface having the mitre guide being prepared for in version.
Figure 16:
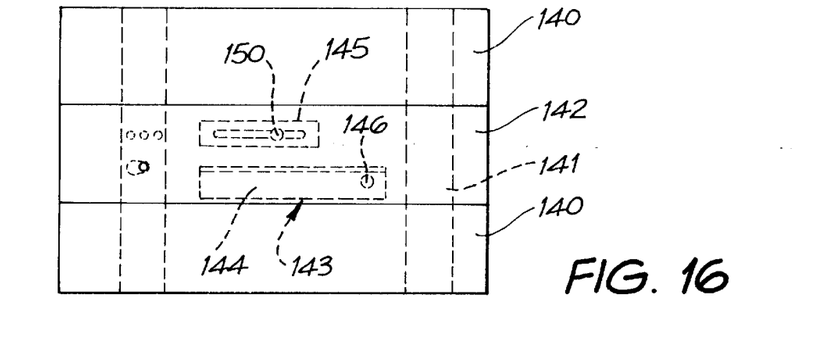
FIG. 16 is a top plan view of a work surface showing the mitre guide in an inverted position.
Figure 17:
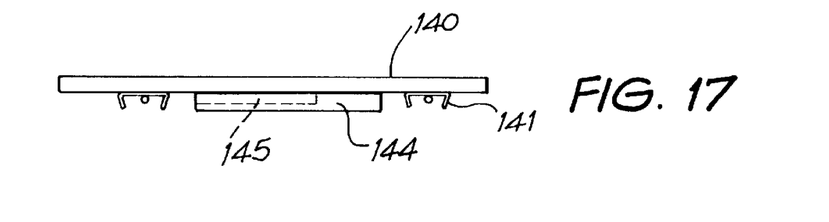
FIG. 17 is a side elevation of the work surface depicted in FIG. 16.
Figure 18:
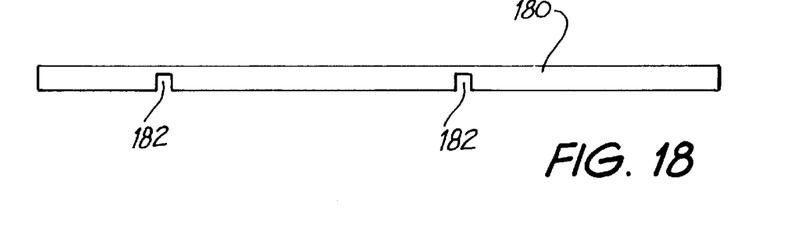
FIG. 18 is a side elevation of a work surface extension.

As shown in FIG. 15, when the mitre guide is not required, it may be folded so that the edges of both the mitre fence and mitre clamp are parallel with the edges of the intermediate bearer. As shown better in FIG. 16, the intermediate bearer may then be inverted and secured to one or both braces 141 so that it no longer forms an obstruction to the work surface. This also provides for convenient storage.

As shown in FIGS. 18 to 21, an extension 180 may be provided for the work surface 181. A plank or board of suitable dimension (for example 90×35 mm framing timber) may be provided with trenches 182 which are spaced apart by a distance which corresponds to the distance between the rotating shafts 183.

Figure 19:
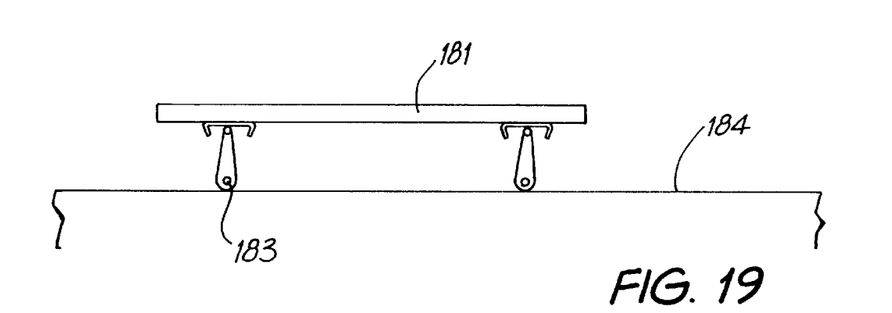
FIGS. 19 to 21 are side elevations illustrating the cooperation between work surface and extension.
Figure 20:
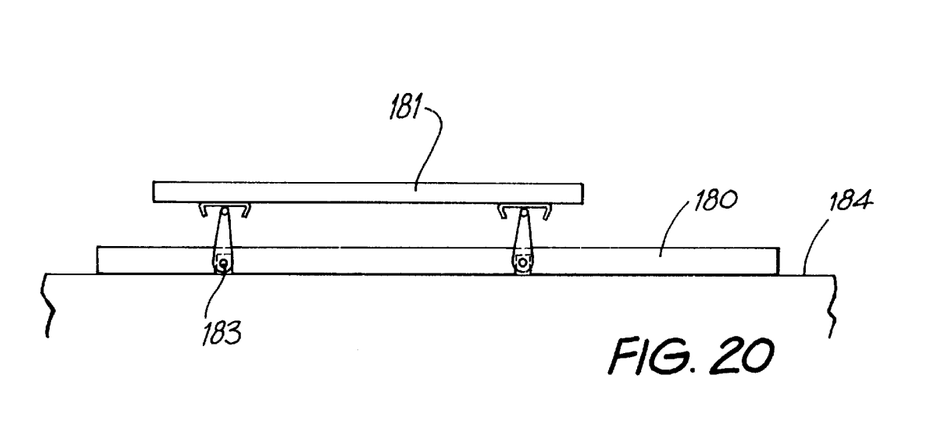
Figure 21:
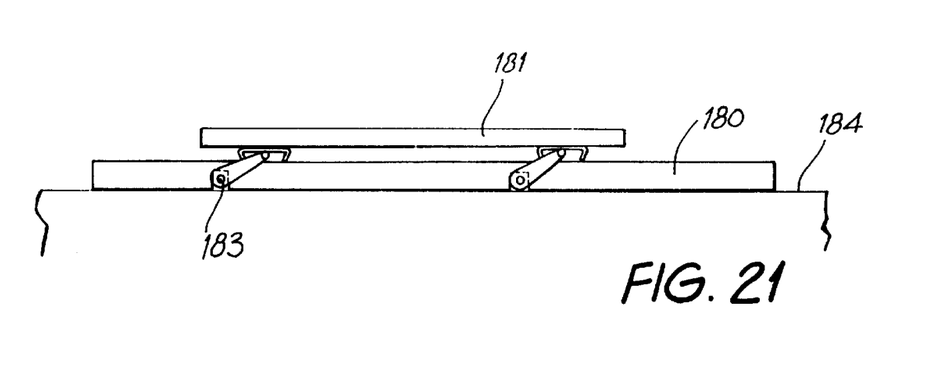

FIG. 19 illustrates the use of the work surface as supported by an ordinary flat surface 184. In FIG. 20, it can be seen that the shafts 183 may be located under the extension 180 and within the pair of trenches 182. Once positioned in this way, the work surface 181 may be lowered as shown in FIG. 21.

As shown in FIG. 22 an alternate embodiment of the retainer 110 (see FIG. 1) is provided. The alternate retainer 190 comprises a tension spring 191 which includes a fixture 192 at one end to attach to the tool guide (item 14 in FIG. 1). The other end of the spring 191 includes a fixture 193 for retaining a spring clamp 194. The spring clamp is adapted to exert a compression force between is normally closed jaws 195. The retainer 190 serves two purposes. On the one hand, the spring clip 194 clamps on to a circular saw and prevents the blade guide from rotating out of a retracted position. In effect the jaws 195 clamp the blade guard from interfering with the forward progress of the saw by maintaining it in a retracted position. Further, the tension exerted by the spring 190, when the saw is advanced, assists in the return of the saw to its initial position. The spring 191 has located within it a rigidising member 196. An external collar may also be used to achieve the same effect. The rigidising member 196 maintains the spring 191 in a "L" or bent configuration at all times. This causes the spring 191 to kink rather than compress when the saw is retracted. It was found that a straight spring would dislodge the spring clip 194 from the tool when the tool was retracted. The kink in the spring 191 prevents the spring clip 194 from being pushed off of the blade guard.

It will be appreciated that certain details of construction have been provided by way of example and that these details should be understood as examples and not as limitations to the scope or spirit of the invention.

I claim:

1. A work station for use with a power tool, the work station including:

a generally planar work surface;

a first track and a second track, mounted in spaced apart relationship adjacent opposite sides of the work surface;

a first carriage and a second carriage mounted for reciprocal sliding movement along the first and second tracks respectively; and a guide for guiding a powered tool with respect to the work surface, the guide extending between, and being respectively pivotally mounted to, the first and second carriages;

wherein the first and second carriages may selectively and independently be positioned on their respective tracks, thereby permitting corresponding adjustment of an angle of the guide means with respect to the work surface, within a plane substantially parallel with the work surface;

the work surface further comprising a pair of spaced apart parallel first bearers connected to one another by a pair of rigid braces;

the braces being attached to the underside of each first bearer;

a second removable intermediate bearer supported between the first bearers.

2. The work station of claim 1, wherein:

the intermediate second bearer supports a mitre guide.

3. The work station of claim 2, wherein:

the second bearer may be inverted and positioned between the first bearers.

4. The work station of claim 2, wherein:

the mitre guide comprises a pivoting mitre force and a pivoting mitre clamp;

the mitre clamp having formed therein an elongated slot about which it pivots an translates.

5. The work station of claim 1, wherein:

the second bearer is the same length and thickness as the first bearers.

6. A work station for use with a power tool, the work station including:

a generally planar work surface;

a first track and a second track, mounted in spaced apart relationship adjacent opposite sides of the work surface;

a first carriage and a second carriage mounted for reciprocal sliding movement along the first and second tracks respectively; and a guide for guiding a powered tool with respect to the work surface, the guide extending between, and being respectively pivotally mounted to, the first and second carriages;

wherein the first and second carriages may selectively and independently be positioned on their respective tracks, thereby permitting corresponding adjustment of an angle of the guide means with respect to the work surface, with a plane substantially parallel with the work surface;

the work station further comprising an adjustable backstop, which is carried in a track.

7. The work station of claim 6, wherein:

the backboard is carried by a plate which has formed in it a threaded opening;

the opening cooperating with a threaded fastener which is used to secure the plate and backboard to any one of a number of positions relative to the rail.

8. The work station of claim 7, wherein:

the plate is "J" shaped.

9. A work station for use with a power tool, the work station including:

a generally planar work surface;

a first track and a second track, mounted in spaced apart relationship adjacent opposite sides of the work surface;

a first carriage and a second carriage mounted for reciprocal sliding movement along the first and second tracks respectively; and a guide for guiding a powered tool with respect to the work surface, the guide extending between, and being respectively pivotally mounted to, the first and second carriages;

wherein the first and second carriages may selectively and independently be positioned on their respective tracks, thereby permitting corresponding adjustment of an angle of the guide means with respect to the work surface, within a plane substantially parallel with the work surface;

the work station further comprising a return spring;

one end of the spring affixed to the guide and the other end carrying a spring clamp.

10. The work station of claim 9, wherein:

the spring has within it a bent rigidising member.

11. A work station for use with a power tool, the work station including:

a generally planar first work surface;

a first track and a second track, mounted in spaced apart relationship adjacent opposite sides of the work surface;

a first carriage and a second carriage mounted for reciprocal sliding movement along the first and second tracks respectively; and a guide for guiding a powered tool with respect to the work surface, the guide extending between, and being respectively pivotally mounted to, the first and second carriages;

wherein the first and second carriages may selectively and independently be positioned on their respective tracks, thereby permitting corresponding adjustment of an angle of the guide means with respect to the work surface, within a plane substantially parallel with the work surface;

the work station further comprising an extension, the extension having spaced apart parallel trenches for receiving a pair of shafts which interconnect the first and second tracks.

12. The work station of claim 11, wherein:

the trenches are formed on an undersurface of a rectangular plank which is longer than the work surface.

13. The work station of claim 11, wherein:

the trenches are formed on the upper surfaces of a pair of parallel timbers, the timbers supporting one or two additional work surfaces, the one or two additional work surfaces being carried by the upper surface and located to either side of the trenches so as to abut the first work surface when the shafts are located in the trenches.

14. The work station of claim 13, wherein:

each additional work surface is flanked by third and fourth tracks which are in alignment with the first and second tracks when the shafts are located in the trenches.

* * * * *